US010104597B2

(12) United States Patent
Ge et al.

(10) Patent No.: US 10,104,597 B2
(45) Date of Patent: Oct. 16, 2018

(54) MESH WLAN CONTROLLER, WLAN DEVICE AND OPERATING METHOD FOR WLAN PROVISIONING

(71) Applicant: PHILIPS LIGHTING HOLDING B.V., Eindhoven (NL)

(72) Inventors: Xiaodong Ge, Eindhoven (NL); Jun Yao, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 63 days.

(21) Appl. No.: 15/229,348

(22) Filed: Aug. 5, 2016

(65) Prior Publication Data

US 2017/0048785 A1    Feb. 16, 2017

(30) Foreign Application Priority Data

Aug. 14, 2015  (WO) ................ PCT/CN2015/086996
Oct. 15, 2015  (EP) ..................................... 15189944

(51) Int. Cl.
*H04W 48/02*    (2009.01)
*H04W 48/16*    (2009.01)
(Continued)

(52) U.S. Cl.
CPC ........... *H04W 48/02* (2013.01); *H04M 1/026* (2013.01); *H04W 48/16* (2013.01); *H04W 84/12* (2013.01); *H04W 84/18* (2013.01)

(58) Field of Classification Search
None
See application file for complete search history.

(56) References Cited

U.S. PATENT DOCUMENTS

2012/0195193 A1*  8/2012  Camps Mur ...... H04W 52/0206
                                                      370/230
2012/0305649 A1    12/2012  Qu et al.
(Continued)

FOREIGN PATENT DOCUMENTS

| JP | 2004266839 A | 9/2004 |
| JP | 2012516647 A | 7/2012 |
| JP | 2014057199 A | 3/2014 |

OTHER PUBLICATIONS

Daniel J. Dubois et al, "Lightweight Self-Organizing Reconfiguration of Opportunistic Infrastructure-Mode WiFi Networks", 2013 IEEE 7th International Conference on Self-Adaptive and Self-Organizing Systems, pp. 247-256, DOI 10.1109/SASO.2013.41.
(Continued)

*Primary Examiner* — Diane Lo

(57) ABSTRACT

A mesh WLAN controller (100) operates in mesh soft-access-point or mesh client modes. When operating in the mesh client mode it performs a mesh network scan, for detecting at least one mesh WLAN BSS (202), send mesh client access requests to mesh WLAN BSSs detected, and, if mesh client access is achieved, provide information indicative to the accessed WLAN BSSs of any other mesh WLAN BSS to which mesh client access is achieved, and if mesh client access is not achieved with any of the detected mesh WLAN BSSs, operate in the mesh soft-access-point mode. Upon receiving an instruction to operate in a mesh bridge-client mode, the controller detects messages from any of the mesh WLAN BSSs (204, 206) with mesh client access, and forwards the received mesh WLAN messages within any other of the mesh WLAN BSSs to which mesh client access has been achieved.

15 Claims, 6 Drawing Sheets

(51) Int. Cl.
*H04M 1/02* (2006.01)
*H04W 84/12* (2009.01)
*H04W 84/18* (2009.01)

(56) References Cited

U.S. PATENT DOCUMENTS

| | | |
|---|---|---|
| 2014/0075523 A1 | 3/2014 | Tuomaala et al. |
| 2014/0092425 A1 | 4/2014 | Park |
| 2014/0187167 A1 | 7/2014 | Yatharth et al. |
| 2014/0233458 A1 | 8/2014 | Georgescu et al. |
| 2015/0117318 A1* | 4/2015 | Qi ................. H04W 76/023 370/329 |
| 2015/0237666 A1 | 8/2015 | Cho |
| 2015/0296397 A1* | 10/2015 | Dural ............... H04W 24/10 370/252 |
| 2016/0323735 A1* | 11/2016 | Lumbatis ........... H04W 48/16 |

OTHER PUBLICATIONS

Guido R. Hiertz et al, "IEEE 802.11S: The WLAN Mesh Standard", IEEE Wireless Communications, Feb. 2010, pp. 104-111.

* cited by examiner

MESH WLAN CONTROLLER, WLAN DEVICE AND OPERATING METHOD FOR WLAN PROVISIONING

FIELD OF THE INVENTION

The present invention is in the field of wireless communication technology. In particular, it is in the field of wireless local area networking (WLAN) technology. In particular, the present invention is related to a mesh WLAN controller, to a WLAN device, to a mesh WLAN basic service set, to a mesh WLAN extended service set, to an infrastructure WLAN configurator device, to a WLAN arrangement, to a method for operating a mesh wireless local area network controller, to a corresponding computer program product, and to a method for operating an infrastructure WLAN configurator device.

BACKGROUND OF THE INVENTION

WLAN is a local area wireless computer networking technology described for instance standards issued by the Institute of Electrical and Electronics Engineers (IEEE) under the 802.11 series of standards. These standards are commonly used today in their 802.11a, 802.11b, 802.11g, and 802.11n versions to provide wireless connectivity. A standard extension IEEE 802.11s is concerned with wireless mesh networks and provides how WLAN devices interconnect to create a wireless mesh network using WLAN technology. The term "mesh" as used in the present specification in many combinations with other terms generally refers to a networking technology that supports multi-hop communication. The term WiFi is frequently used as a synonym to WLAN technology and is also considered a synonym in the context of the present specification.

Devices configured to operate in accordance with a wireless local area network technology under one or more standards of the IEEE 802.11 series will be referred to as a WLAN device herein. There has been a fast growing interest in WLAN devices, for instance under the headline "intern of things (IoT)", which refers to a connectivity of objects using embedded wireless technology. Such objects form a WLAN device in addition to one or more other functionalities implementing a respective other device application. A WLAN device of this type is therefore also called a WLAN application device herein. WLAN devices are also gaining popularity in the market because of their connectivity to the internet based on their native use of the interne protocol (IP).

A quick drop of production costs for WLAN controllers, which are also referred to as WLAN modules in the art and for instance provided in the form of a system on chip (SoC), has helped further accelerating the penetration of WLAN technology into wireless control applications in various fields of technical application, such as for example ventilation and air conditioning control, or power plugs. WLAN connectivity has also entered the lighting domain.

A commissioning of a large number of WLAN devices is typical in some fields of application. The commissioning involves multiple steps. A first step is a mechanical and electrical installation of the WLAN devices. This step is usually handled by construction contractors. The second step is to program all the newly installed WLAN devices to connect to a WLAN basic service set (BSS), which is also referred to as WLAN provisioning and which is a task that requires knowledge of WLAN technology. Such WLAN provisioning involves providing newly installed WLAN devices with WLAN credential information to achieve access to the desired WLAN BSS. Many WLAN application devices form headless WLAN devices, such as light bulbs or luminaires, which do not have a user interface, such as a keyboard or touch panel on the device to allow a user entering WLAN network credentials for setting up the network connection.

WLAN provisioning thus forms a crucial entry point for any WLAN device, which often prohibits handling by construction contractors. However, a WLAN application device reseller will be reluctant to send skilled communication engineers to perform the WLAN provisioning, since it will take a large amount of expert time to connect the large number of WLAN devices to a desired WLAN BSS.

Therefore, it has become common practice for a user to employ a WLAN configurator device, which may take the form of a smartphone, a tablet computer or a laptop computer, to facilitate the WLAN provisioning process. Such a WLAN configurator device is to communicate the WLAN credentials to the new WLAN devices.

US 2014/0187167 A1 describes a computing device for provisioning a wireless device for connection to a wireless network via a legacy access point. The wireless device supports a wireless protected setup protocol for obtaining the network profile of the network. A user requests the computing device to discover wireless devices for provisioning. In response to the user input, the computing device is configured as a soft access point and broadcasts a beacon signal indicating that the access point supports a wireless protected setup protocol, such as WLAN Protected Setup. A request for provisioning is then received by the computing device from the wireless device. A network profile is transmitted from the computing device to the wireless device in accordance with the wireless protected setup protocol. The wireless device may use the profile to connect to the network via the legacy access point using the network profile.

SUMMARY OF THE INVENTION

According to a first aspect of the invention, a mesh wireless local area network controller in accordance with claim 1 is provided. It is referred to herein in short as a mesh WLAN controller. The mesh WLAN controller is configured to operate in a mesh soft-access-point mode and in a mesh client mode. The mesh WLAN controller is further configured, when operating in the mesh client mode,
to perform a mesh network scan upon initial power-on, for detecting at least one mesh WLAN basic service set (mesh WLAN BSS),
to send a mesh client access request to at least one of the mesh WLAN BSSs detected, and, if mesh client access has been achieved, provide mesh client access information to the accessed WLAN BSSs indicative of any other mesh WLAN BSS (202, 204, 206), to which mesh client access has been achieved, and
if mesh client access is not achieved in exchange with any of the detected mesh WLAN BSSs, switch to operating in the mesh soft-access-point mode.

The mesh WLAN controller of the first aspect of the invention provides functional operation of a WLAN device as either a mesh soft access point or as a mesh client. The mesh WLAN controller may also be called a mesh WLAN module or a mesh WLAN driver with the same meaning.

When operating in a mesh soft-access-point mode, the mesh WLAN controller is configured to provide soft-access-point functions in an associated mesh WLAN BSS. When operating in a mesh-client mode, the mesh WLAN controller controls sending a mesh client access request to at least one of the mesh WLAN BSSs detected, and, if mesh client access has been achieved, providing mesh client access information indicative to the accessed WLAN BSSs of any other mesh WLAN BSS to which mesh client access has been achieved. This allows a single WLAN device an access to two or more mesh WLAN BSSs. This way, it is known within a given mesh WLAN BSS, which mesh client has access to any other mesh WLAN BSSs. In this constellation, the mesh WLAN controller enables a special mesh WLAN networking concept that can be used in different embodiments and many application scenarios of WLAN devices to achieve a simple and fast communication with low signaling overhead between different WLAN devices that comprise the mesh WLAN controller. The mesh WLAN controller of the first aspect of the present invention thus allows implementing a self-organized mesh WLAN networking concept different from a standard infrastructure or ad-hoc WLAN networking concept. While being applicable in general for many different application cases, the concept is particularly suited for networking applications involving headless WLAN devices.

A mesh WLAN basic service set (BSS) forms a building block of a mesh WLAN extended service set (ESS), and is to some extent comparable, but technically distinguished from an infrastructure WLAN BSS and from a WLAN Independent BSS (IBSS) that form basic building-blocks of a 802.11 WLAN of the infrastructure or ad-hoc type, respectively. In particular, a given mesh WLAN BSS contains one mesh soft access point and one or more mesh WLAN clients. Mesh WLAN clients are each allowed to request and achieve access in parallel to one or more other mesh WLAN BSSs, i.e., operate as a mesh WLAN client of the given mesh WLAN BSS and such one or more other mesh WLAN BSSs at the same time.

The mesh WLAN controller of the present invention achieves a self-organized formation of a mesh WLAN BSS, and of a mesh WLAN extended service set (ESS) containing a plurality of interconnected mesh WLAN BSSs. For upon initial power-on, i.e., when the mesh WLAN controller is operated for the first time after fabrication, after a power down, or after receiving a reset command, the mesh WLAN controller will operate in the mesh client mode to detect and request access to one or more detected existing mesh WLAN BSSs. If operation in a mesh client mode is impossible due to lack of any accessible mesh WLAN BSSs, the mesh WLAN controller will switch to the soft-access-point mode and thus create a new mesh WLAN BSS for allowing mesh client access to other WLAN devices. Since operation as a mesh WLAN client forms a default mode of operation, a signaling overhead in a mesh WLAN ESS is kept small.

References to an infrastructure WLAN BSS and to an ad-hoc WLAN Independent BSS within the present specification refer to a standard WLAN BSS or IBSS in accordance with a standard document of the standard series mentioned above and published prior to the first filing date of the present specification. In comparison with such existing standards, the mesh WLAN BSS and its features disclosed herein are non-standard, in particular in that the mesh WLAN controller provides additional functionality related to operating in a mesh soft-access point mode. In the following, embodiments of the mesh WLAN controller will be described.

The mesh WLAN controller serves for controlling mesh WLAN operation of a mesh WLAN device. Different embodiments of the mesh WLAN controller take the form of an electronic component, for instance of an application-specific circuit or a system on chip, or of a microcontroller, or of an embedded programmable processor for executing stored program code implementing the functionality of the mesh WLAN controller.

Preferred embodiments of the mesh WLAN controller further provide a mesh-bridge-client functionality, which allows forwarding mesh WLAN messages between different mesh WLAN BSSs. In a mesh WLAN based on the present embodiment, multi-hop-communication is enabled only between mesh WLAN devices allocated to two or more mesh WLAN BSSs within a mesh WLAN ESS. In this embodiment, the mesh WLAN controller is preferably further configured when operating in the mesh client mode, and upon having achieved mesh client access to more than one mesh WLAN BSS and receiving an instruction to operate in a mesh bridge-client mode, to detect and to receive mesh WLAN messages from any of the mesh WLAN BSSs to which mesh client access has been achieved, and to forward the received mesh WLAN messages within at least one other, preferably any other of the mesh WLAN BSSs to which mesh client access has been achieved.

For clarification, in this embodiment the described functionality of the mesh bridge-client mode of forwarding the received mesh WLAN messages is not provided while operating in the basic mesh client mode, i.e., with access to only one mesh WLAN BSS. The mesh bridge-client mode of the mesh WLAN controller can thus only be enabled under the pre-condition of having achieved mesh client access to two or more mesh WLAN BSSs. Furthermore, only mesh WLAN controllers operating in the bridge-client mode are enabled to provide forwarding of received mesh WLAN messages from one mesh WLAN BSS to another. In other words, only those mesh WLAN controllers which are operating in the bridge-client mode are enabled to provide multi-hop communication between the mesh WLAN BSSs to which they have access. Based on mesh WLAN controllers of the present embodiment, a particularly low signalling amount in mesh WLAN communication is achieved, because only those mesh WLAN devices forming bridge clients, i.e., operating in the bridge-client mode contribute to the forwarding of mesh WLAN messages between different mesh WLAN BSSs.

In comparison, IEEE 802.11s WLAN technology requires that any node acts as a router relaying messages. Such standard WLAN technology creates a much larger amount of signalling the communication of WLAN messages within a WLAN ESS. In some embodiments, the mesh WLAN controller is configured to wait for a random time span upon initial power-on before performing the mesh WLAN scan. This embodiment provides a time distribution of initial mesh WLAN signaling in a WLAN arrangement forming an installation of a large number of WLAN devices. At the same time, this random time distribution of the start of operation helps the self-organization process in the formation of a mesh WLAN BSS and a mesh WLAN ESS.

In application cases, a mesh WLAN BSS and mesh WLAN ESS may co-exist in an environment that also comprises infrastructure or ad-hoc WLAN devices operating in an existing infrastructure WLAN BSS or an ad-hoc WLAN IBSS. However, connection of such infrastructure WLAN device to the mesh WLAN BSS may not be desired. An advantageous embodiment of the mesh WLAN controller solving this problem is configured, when operating in the mesh soft-access-point mode, to provide a unique mesh basic service set identifier, herein mesh BSS identifier, which allows an identification of the WLAN node as a mesh soft access point of a mesh WLAN BSS, which implies that it is not at the same time associated with an infrastructure WLAN BSS or a WLAN IBSS.

In a further embodiment, the mesh WLAN controller is configured, when operating in the mesh soft-access-point mode, and upon receiving a mesh client access request from an external mesh WLAN device, to allow the external mesh WLAN device access to the mesh WLAN BSS, unless a predetermined maximum number of external mesh WLAN devices already have access to the mesh WLAN BSS. In this embodiment, the mesh WLAN controller is further configured, upon determining that an external mesh WLAN device has mesh client access to not only the subject mesh WLAN BSS, but additionally to a number of external other mesh WLAN BSSs, to instruct the external mesh WLAN device to operate in the mesh bridge-client mode.

In one such embodiment the mesh WLAN controller is configured, when operating in the mesh soft-access-point mode, to determine and provide the mesh BSS identifier (BSSID) as a code including a unique network identifier and a mesh type identifier, the mesh type identifier indicating that the BSS is a mesh WLAN BSS that is distinguished from an infrastructure WLAN BSS and from an ad-hoc WLAN IBSS. In one exemplary embodiment, the mesh BSSID or a network ID of the mesh WLAN BSS is flagged, such that other mesh WLAN devices can recognize this WLAN BSS as a special mesh WLAN BSS created by a similar type of mesh WLAN device, whereas WLAN devices operating only in an infrastructure WLAN BSS will not identify the mesh WLAN BSS as a compatible infrastructure WLAN BSS. In one variant of this embodiment, a certain bit position of the mesh BSSID is set so as to be indicative of the mesh WLAN BSS type. As a specific example, a second least bit of a first byte of the mesh BSSID may be set to one. According to the 802.11 standard, this bit forms a mark of a locally administrated MAC address, and it is therefore not used by a normal infrastructure WLAN device. Other bits in the mesh BSSID can be used for identifying a mesh WLAN device type. However, the identifier of the BSS can also be used for this purpose. In any case, this achieves that only similar types of mesh WLAN devices will form the mesh WLAN BSS and a corresponding mesh WLAN ESS, and other type of mesh WLAN devices may choose not to request access to it.

In a further embodiment, that is particularly suited for a batch WLAN provisioning to a large number of WLAN devices and will be referred to as the WLAN batch provisioning embodiment further below, the mesh WLAN controller comprises a wired control interface for exchanging control communication with an infrastructure WLAN controller unit, and is configured to detect in a received mesh WLAN message infrastructure WLAN credential information pertaining to an infrastructure WLAN BSS, and to provide the received infrastructure WLAN credential information as an output via the control interface, and to subsequently switch to an inactive mode. Based on this functionality, a mesh WLAN ESS formed can quickly be provisioned for operation in an infrastructure WLAN arrangement by an external configurator device, by passing the infrastructure WLAN parameters to each node automatically via the mesh WLAN ESS. All the mesh WLAN devices to be configured for infrastructure WLAN operation are already in the mesh WLAN ESS, and the configurator can provision all the devices without requiring the intervening of a user. After the infrastructure WLAN provisioning is finished, the mesh WLAN controller will switch off and thus the mesh WLAN network will be switched off as well, and WLAN controller operation will switch to the targeted infrastructure WLAN network.

The present embodiment of the mesh WLAN controller is preferably integrated with the infrastructure WLAN controller, the latter providng some functionalities of infrastructure WLAN technology which are per se known. A preferred embodiment of this mesh WLAN controller, which is particularly suited for operation in the context of the mesh WLAN networking embodiments described herein, further comprises an integrated infrastructure WLAN controller unit, which is configured to remain in an inactive mode upon initial power-on,
upon receiving the infrastructure WLAN credential information from the mesh WLAN controller via the control interface, operate in an infrastructure station mode controlling infrastructure WLAN communication with the infrastructure WLAN BSS for requesting allowance as an infrastructure WLAN station to the infrastructure WLAN BSS.

This mesh WLAN controller can be implemented in integrated form with the infrastructure WLAN controller, for instance by adding a thin layer of code into a known infrastructure WLAN controller, so it can be easily added into any currently known WLAN SoC platform. Modifications to the conventional infrastructure WLAN controller to additionally implement the mesh WLAN controller will therefore not affect the normal behavior of a WLAN device according to existing standards.

The above embodiment is extended for operability in a WLAN IBSS in one variant by comprising a wired control interface for exchanging control communication with an integrated ad-hoc WLAN controller unit. In this embodiment detection of ad-hoc WLAN credential information pertaining to a WLAN IBSS in a received mesh WLAN message leads to providing the received ad-hoc WLAN credential information as an output via the control interface, and to subsequently switching to an inactive mode.

According to a second aspect of the invention, a WLAN device is provided, comprising a mesh WLAN controller according to the first aspect of the invention or one of its embodiments, in particular in accordance with the batch provisioning embodiment of the mesh WLAN controller, and an infrastructure WLAN controller.

The infrastructure WLAN controller comprises a control interface for exchanging control communication with the mesh WLAN controller, and is configured to remain in an inactive mode upon initial power-on, and upon receiving the infrastructure WLAN credential information from the mesh WLAN controller via the control interface, to operate in an infrastructure station mode controlling infrastructure WLAN communication of the WLAN device with the infrastructure WLAN BSS for requesting allowance as an infrastructure WLAN station to the infrastructure WLAN BSS.

The WLAN device forms an application device implementing any desired application and to this end comprises the mesh WLAN controller connected with an application unit for achieving application control communication that can be received and transmitted via a WLAN technology. The WLAN device of this aspect of the invention, in addition to providing standard WLAN functionality, allows achieving a mesh WLAN based provisioning of an infrastructure WLAN to a large number of WLAN devices, for instance hundreds or thousands of WLAN devices.

In preferred embodiments, the WLAN device is a headless WLAN device. For instance, commissioning hundreds of luminaires at once on one building floor is not uncommon and can be achieved implementing the luminaires as a WLAN device according to the second aspect of the invention. The WLAN device is herein also referred to for clarification purposes as a mesh WLAN device or in short as a node or as a device in the context of the description of WLAN devices forming a WLAN BSS.

One embodiment of the WLAN device additionally comprises an ad-hoc WLAN controller for controlling operation in a standard WLAN IBSS. It comprises a control interface for exchanging control communication with the mesh WLAN controller, and is configured to remain in an inactive mode upon initial power-on, and upon receiving the ad-hoc WLAN credential information from the mesh WLAN controller via the control interface, to operate in an infrastructure station mode controlling ad-hoc WLAN communication of the headless WLAN device with a soft access point of a WLAN IBSS for requesting allowance as an WLAN station to the WLAN IBSS.

According to a third aspect of the present invention, a mesh WLAN BSS is provided. The mesh WLAN BSS comprises a plurality of WLAN devices, in particular headless WLAN devices according to the second aspect of the invention or one of its embodiments. The mesh WLAN BSS shares the advantages and embodiments of the WLAN device of the second aspect of the invention. In one embodiment, the mesh WLAN BSS is implemented as an open network with no security required to join and therefore allows a WLAN configurator device particularly easily joining the new mesh WLAN BSS in the context of WLAN provisioning.

According to a fourth aspect of the present invention, a mesh WLAN extended service set, herein mesh WLAN ESS, is provided. It comprises a plurality of mesh WLAN BSSs according to the third aspect of the invention or one of its embodiments. The mesh WLAN ESS shares the advantages of the mesh WLAN BSS of the third aspect of the invention. In particular, the self-organized "lightweight" mesh WLAN ESS of the fourth aspect of the invention can be used only temporarily, for passing few infrastructure WLAN configuration parameters to the WLAN devices. The term "lightweight" is used to indicate that in comparison with any of the standard mesh network solutions, such as IEEE 802.11s, a particularly small signalling load is required for operating the WLAN ESS. The simple mesh WLAN ESS of the present aspect has sufficient functions and reliability for a one time use case like the provisioning of infrastructure WLAN credential information whereas existing standards would overtax the signalling capacity in particular in the presence of a large number of WLAN devices requiring provisioning of WLAN credentials.

Thus, performance or reliability is not of primary concern for the design of the mesh WLAN ESS of the present aspect of the invention. Instead, ease of implementation on an existing WLAN platform is desired and achieved.

According to a fifth aspect of the present invention, an infrastructure WLAN configurator device is provided, which comprises a mesh WLAN controller according to the first aspect of the invention or one of its embodiments, in particular according to the batch provisioning embodiment of the mesh WLAN controller of the first aspect of the invention. Furthermore, the infrastructure WLAN configurator device comprises a configuration interface configured to receive infrastructure WLAN credential information from an external entity and to provide the received infrastructure WLAN credential information to the mesh WLAN controller. The mesh WLAN controller is additionally configured to receive the infrastructure WLAN credential information from the configuration interface and to forward the received infrastructure WLAN credential information in the form of at least one mesh WLAN message within at least one, in one embodiment within any of the mesh WLAN BSSs to which mesh client access has been achieved.

The infrastructure WLAN configurator device of the fifth aspect is particularly suited for provisioning an infrastructure WLAN to a large number of WLAN devices according to the second aspect of the invention or one of its embodiments. It therefore shares the advantages of the previously described first to fourth aspects of the invention.

In one embodiment, the infrastructure WLAN configurator device additionally has an infrastructure WLAN controller. The mesh WLAN controller and the infrastructure WLAN controller are configured to mutually exchange control communication via their respective control interfaces. In this embodiment the infrastructure WLAN configurator device can receive the infrastructure WLAN credential information form a standard infrastructure WLAN BSS and forward it to the mesh WLAN BSS for infrastructure WLAN provisioning.

In one embodiment, the infrastructure WLAN configurator device is additionally configured to deactivate the mesh WLAN controller upon successfully forwarding the infrastructure WLAN credential information. In case operation in a standard infrastructure is possible by the provision of an infrastructure WLAN controller, the infrastructure WLAN controller can be activated at this point in time.

According to a sixth aspect of the invention a WLAN arrangement is provided, which comprises an infrastructure WLAN access point, a mesh WLAN ESS according to the fourth aspect of the invention or one of its embodiments, and an infrastructure WLAN configurator device according the fifth aspect of the invention or one of its embodiments.

According to a seventh aspect of the invention, a method for operating a mesh wireless local area network controller, herein mesh WLAN controller, comprises
  operating the mesh WLAN controller either in a mesh
    soft-access-point mode or in a mesh client mode, and,
    when operating in the mesh client mode,
  performing a mesh network scan upon initial power-on,
    for detecting at least one mesh WLAN BSS,
  sending a mesh client access request to at least one of the mesh WLAN BSSs detected, and, if mesh client access has been achieved, providing to the accessed WLAN BSSs mesh client access information indicative of any other mesh WLAN BSS to which mesh client access has been achieved, and
  if mesh client access has not been achieved in exchange
    with any of the detected mesh WLAN BSSs, switching
    to operating in the mesh soft-access-point mode.

The method of the seventh aspect of the invention shares the advantages described in the context of the first to sixth aspects of the invention.

In one embodiment, the method further comprises, when operating in the mesh client mode, and if mesh client access has been achieved to more than one of the mesh WLAN BSSs detected and upon receiving an instruction to operate in a mesh bridge-client mode, detecting mesh WLAN messages from any of the mesh WLAN BSSs to which mesh client access has been achieved and forwarding the received mesh WLAN messages within at least one other, in one variant within any other of the mesh WLAN BSSs to which mesh client access has been achieved.

According to an eighth aspect of the invention, a computer program product is provided, comprising executable code causing a computer or processor when running on or loaded into the computer or processor, to perform the method of the seventh aspect of the invention or one of its embodiments.

According to a ninth aspect of the invention, a method for operating an WLAN configurator device is provided, the method comprising:

receiving infrastructure or ad-hoc WLAN credential information from an external entity;

performing a mesh network scan for detecting at least one mesh WLAN BSS of a mesh WLAN ESS;

sending a mesh client access request to at least one of the mesh WLAN BSSs detected; and, if mesh client access has been achieved; and providing the received infrastructure WLAN credential information to a mesh WLAN device of at least one of the mesh WLAN BSSs, to which mesh client access has been achieved, in the form of at least one mesh WLAN message.

The method of the ninth aspect is based on the mesh WLAN concept implemented by one or more of the first to eights aspects of the present invention. It allows a particularly simple automated provisioning of WLAN credentials with a small signalling load. No user input is required in the provisioning process.

The method is, mutatis mutandis, applicable for infrastructure or ad-hoc WLAN provisioning. The credential information is in this case related to an infrastructure WLAN BSS or an ad-hoc standard WLAN IBSS, respectively.

According to one embodiment of this method, providing the received infrastructure or ad-hoc WLAN credential information comprises the WLAN configurator device sending a route request command to the mesh WLAN ESS, with a destination address being a broadcast address for all mesh WLAN devices of the mesh WLAN ESS;

receiving route reply messages and maintaining a list of all responding mesh WLAN devices in the WLAN ESS; and communicating directly using unicast communication with each node in the WLAN ESS for providing the infrastructure or ad-hoc WLAN credential information.

This way, the infrastructure WLAN configurator device can directly provide the infrastructure WLAN credential information in unicast communication to each of the mesh WLAN devices in the mesh WLAN ESS. Alternative embodiments use multicast communication instead of unicast communication.

According to a tenth aspect of the invention, a computer program product is provided, comprising executable code causing a computer or processor when running on or loaded into the computer or processor, to perform the method of the ninth aspect of the invention or one of its embodiments.

It shall be understood that the mesh WLAN controller of the first aspect of the invention, also defined in claim 1, the WLAN device of the second aspect of the invention, the mesh WLAN BSS of the third aspect of the invention, the mesh WLAN extended service set of the fourth aspect of the invention, the infrastructure WLAN configurator device of the fifth aspect of the invention, the WLAN arrangement of the sixth aspect of the invention, the method of the seventh aspect of the invention, the computer program of the eighth aspect of the invention, the method of the ninth aspect of the invention and the computer program of the tenth aspect of the invention have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
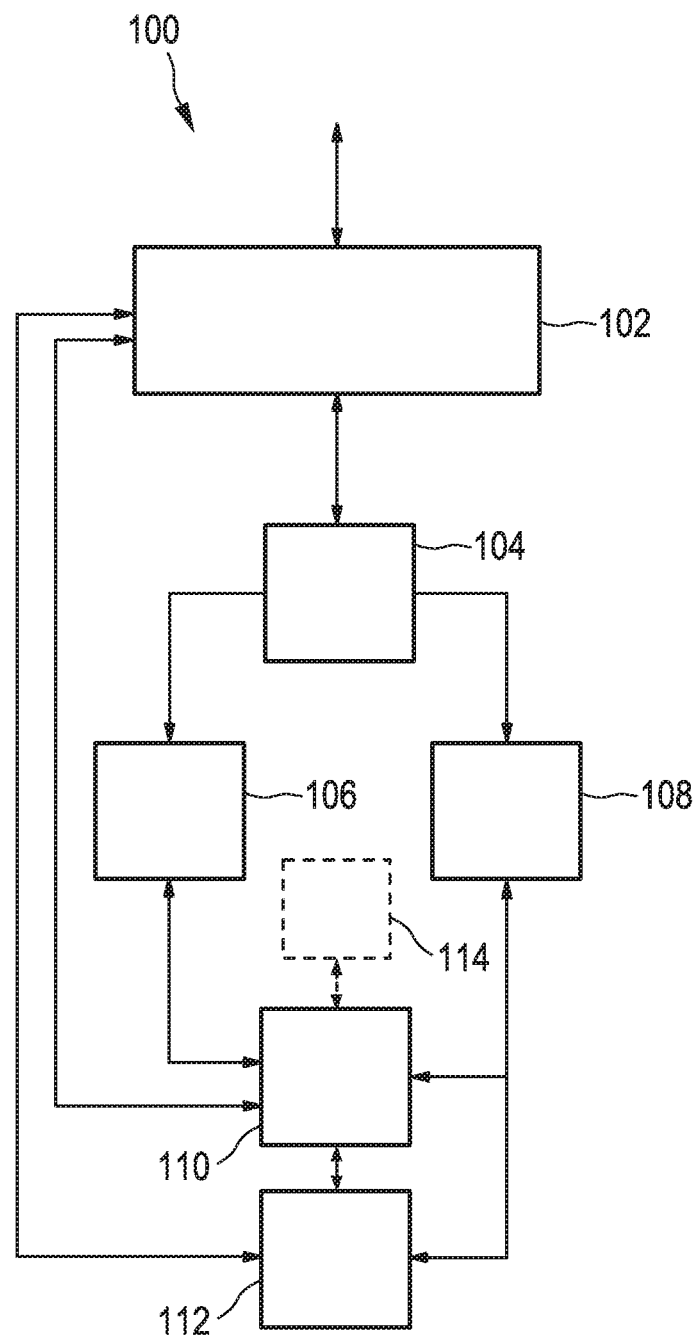
FIG. 1 is a block diagram of an embodiment of a mesh WLAN controller.

FIG. 1 is a block diagram of an embodiment of a mesh WLAN controller 100. The mesh WLAN controller is represented schematically. The block diagram of FIG. 1 concentrates on those parts of the mesh WLAN controller which are required to understand its operation. In particular, only units related to baseband operation are shown. Units related to control of radio frequency (RF) operation of a WLAN device, which may also be integrated the mesh WLAN controller 100, are omitted for reasons of reducing the complexity of the present specification.

The mesh WLAN controller 100 has a WLAN control interface 102 for receiving and providing baseband control and payload information. An operation control unit 104 serves for switching an operational mode of the mesh WLAN controller to either a mesh soft-access-point (soft AP) mode or a mesh client mode. For operating in the mesh soft-access-point mode, a mesh soft AP control unit 106 is to be activated by the operation control unit 104. For operating in the mesh client mode, a mesh client control unit 108 is to be activated by the operation control unit 104.

A mesh network management unit 110 can be activated by the mesh client control unit 108 and is configured, when operating in the mesh client mode, to initiate and control a mesh network scan for detecting at least one mesh WLAN BSS. For performing a mesh network scan, a corresponding signaling according to the WLAN standard has to be performed. In particular, the operation control unit 104 activates the mesh client control unit 108 upon initial power-on to control performance of a mesh network scan.

The mesh network scan serves to detect existing mesh WLAN BSSs in the environment of a WLAN device embedding the mesh WLAN controller 100. Any mesh WLAN BSS is represented by a respective WLAN device that is operated by its mesh WLAN controller in the mesh soft-access-point mode. To distinguish a mesh WLAN BSS from other types of WLAN BSS, a mesh WLAN BSS is identified by a mesh BSS identifier (BSSID) that is modified in comparison to a BSSID of an infrastructure WLAN BSS. In particular, the mesh BSSID is implemented as a code including a unique network identifier and a mesh type identifier. The mesh type identifier is not a part of an infrastructure WLAN BSS: The mesh type identifier provides the information that the BSS is a mesh WLAN BSS that is distinguished from and in particular not operative as an infrastructure WLAN BSS or an ad-hoc WLAN Independent BSS (IBSS).

In one specific form, the mesh BSSID is flagged to distinguish it from an infrastructure WLAN BSS. For instance, the second least bit of a first byte of the BSSID is set to one. This setting will be indicative of a special type of BSSID to WLAN devices receiving this type of BSSID. Of course, the allocation of bit values for this particular bit could be defined in an opposite manner in another embodiment. According to the existing WLAN standards this particular bit is not used by infrastructure WLAN BSSs as it is a mark of a locally administrated MAC address. When the bit is set to 1 then the MAC address is recognized as being changed to a unique MAC address that is locally setup. As such, it is not used for normal infrastructure WLAN BSS.

An exemplary mesh BSSID according to the present embodiment having 6 Octets is given below in Table 1 in binary network order format (second row). In other words, the least significant bit of an octet is shown to the left. Furthermore, a hexadecimal (Hex) representation of the BSSID (in normal order) is given in the third row of Table 1. In the present example, the second least bit of the first byte, which is Octet 0 (0111 0101) of the mesh BSSID is set to 1.

TABLE 1

| | Octet | | | | | |
|---|---|---|---|---|---|---|
| | 0 | 1 | 2 | 3 | 4 | 5 |
| Binary | 0111 0101 | 0111 1011 | 0001 0010 | 0000 0000 | 0000 0000 | 0000 0001 |
| Hex | AE | DE | 48 | 00 | 00 | 80 |

Other bits in the mesh BSSID can also be used for recognizing a WLAN device type, such as light bulb, climate control device, etc. This way, only WLAN devices of a similar application type can selectively join a given mesh WLAN BSS, while devices of other application types may be instructed not to join it.

The mesh client control unit 108 is further configured to control operation of a mesh network access management unit 110 in sending a mesh client access request to at least one, and preferably to a plurality of mesh WLAN BSSs detected. Advantageously the mesh client request is sent to all mesh WLAN BSSs detected. If mesh client access has been achieved to any mesh WLAN BSS, the mesh network access management unit 110 is to provide mesh client access information indicative to the accessed WLAN BSSs of any other mesh WLAN BSS to which mesh client access has been achieved to the mesh client control unit 108. In one variant, the mesh network access management unit 110, before requesting access to any further mesh WLAN BSS, will wait for corresponding instructions from a mesh WLAN BSS accessed first.

Preferred embodiments additionally provide a bridge-client mode of operation. Any incoming instruction from a WLAN BSS to operate in a mesh bridge-client mode will be detected by the mesh client control unit 108 and triggers the mesh client control unit 108 to additionally activate a mesh bridge client control unit 112. The mesh bridge client control unit 112 is operative to detect reception of mesh WLAN messages from any of the mesh WLAN BSSs to which mesh client access has been achieved and trigger forwarding such received mesh WLAN messages within any other of the mesh WLAN BSSs to which mesh client access has been achieved. Thus, message forwarding between different mesh WLAN BSSs is performed only when operating in the mesh bridge-client mode. It is not enabled in the mesh client mode and not enabled in the mesh soft-access-point mode.

In one optional variant, as indicated by dashed lines, a random delay controller 114 is additionally provided and connected with the mesh network access management unit 110. The random delay controller 114 serves for delaying, by a random delay time span, the triggering the mesh WLAN network scan or the sending of a mesh client access request to the mesh WLAN BSSs by the mesh network access management unit 110 upon initial power-on. In a mesh WLAN installation with a large number of WLAN devices to form soft APs or mesh clients of mesh WLAN BSSs, this achieves that different un-provisioned WLAN devices will activate the mesh soft-access-point mode at different points in time, even if all of the WLAN devices are powered on at the same time. In other variants, which are suitable for mesh networking with smaller numbers of WLAN devices the random delay controller 114 is not present or deactivated.

On the other hand, if mesh client access is not achieved in exchange with any of the detected mesh WLAN BSSs, the mesh client control unit 108 provides this information to the operation control unit 104 which is configured, in response to receiving this information, to switch to operating in the mesh soft-access-point mode, i.e., deactivate the mesh client control unit 108 and activate the mesh soft AP control unit 106.

Furthermore, operating in the mesh soft-access-point mode, the mesh soft AP control unit 106 instructs the network access management unit 110 to determine and provide the unique BSS identifier, which as discussed allows an identification of the WLAN device carrying the mesh WLAN controller as a mesh soft access point of a mesh WLAN BSS.

Upon receiving a mesh client access request from an external mesh WLAN device when operating in the soft-access-point mode, the network access management unit 110 will allow the external mesh WLAN device access to the mesh WLAN BSS, unless a predetermined maximum number of external mesh WLAN devices already have access to the mesh WLAN BSS.

Furthermore, upon receiving information via a WLAN message that allows determining that an external mesh WLAN device has mesh client access to not only the subject mesh WLAN BSS, but additionally to a number of external other mesh WLAN BSSs, the network access management unit 110 instructs the external mesh WLAN device to operate in the mesh bridge-client mode. A WLAN device operating in the mesh bridge-client mode can forward packets between different mesh WLAN BSSs.

In one variant, the network access management unit instructs only selected external mesh WLAN devices to operate in the mesh bridge-client mode. This way, the soft AP can select an optimum configuration for interconnecting with other mesh WLAN BSSs and thus reduce a signaling amount. For example, after a time span $T_{settle}$, which is as maximum formation time one mesh WLAN BSS can take, a WLAN device operating in a soft-access-point mode will read back the scanned mesh WLAN BSSIDs from each of its associated client WLAN devices. The soft AP device will pick some of these client WLAN devices to operate in the mesh bridge client mode (i.e., as mesh bridge WLAN devices), such that these mesh bridge WLAN devices can connect to nearby mesh WLAN BSSs. In one example, there is a predetermined minimum number of detected other WLAN BSSs to qualify for operation in the mesh bridge client mode.

In an alternative variant, the network access management unit of the mesh WLAN controller operating in the soft-access-point mode (and thus the soft AP of the mesh WLAN BSS) instructs not only selected ones, but all those mesh clients that can see other mesh WLAN BSSs to operate in the mesh bridge-client mode.

In another variant, the mesh WLAN controller, when operating in the mesh bridge client mode, is configured to switch to a power saving mode, for instance following a periodic sleep/wake up scheme. This will be indicated to the associated WLAN BSSs, and the associated soft AP devices will buffer any messages designated to the bridge devices.

The mesh WLAN controller can be implemented using a known WLAN controller and modifying the functionality, in particular with respect to the described special mesh BSSID and with respect to operation in the mesh bridge client mode involving inter-BSS communication.

Thus, one the basis of operation of the mesh WLAN controller 100 in a WLAN arrangement comprising a larger number of WLAN devices, there will be many mesh WLAN BSSs created within a certain while after powering on all WLAN devices. This will be further illustrated and explained in the following making additional reference to FIG. 2.

Figure 2:
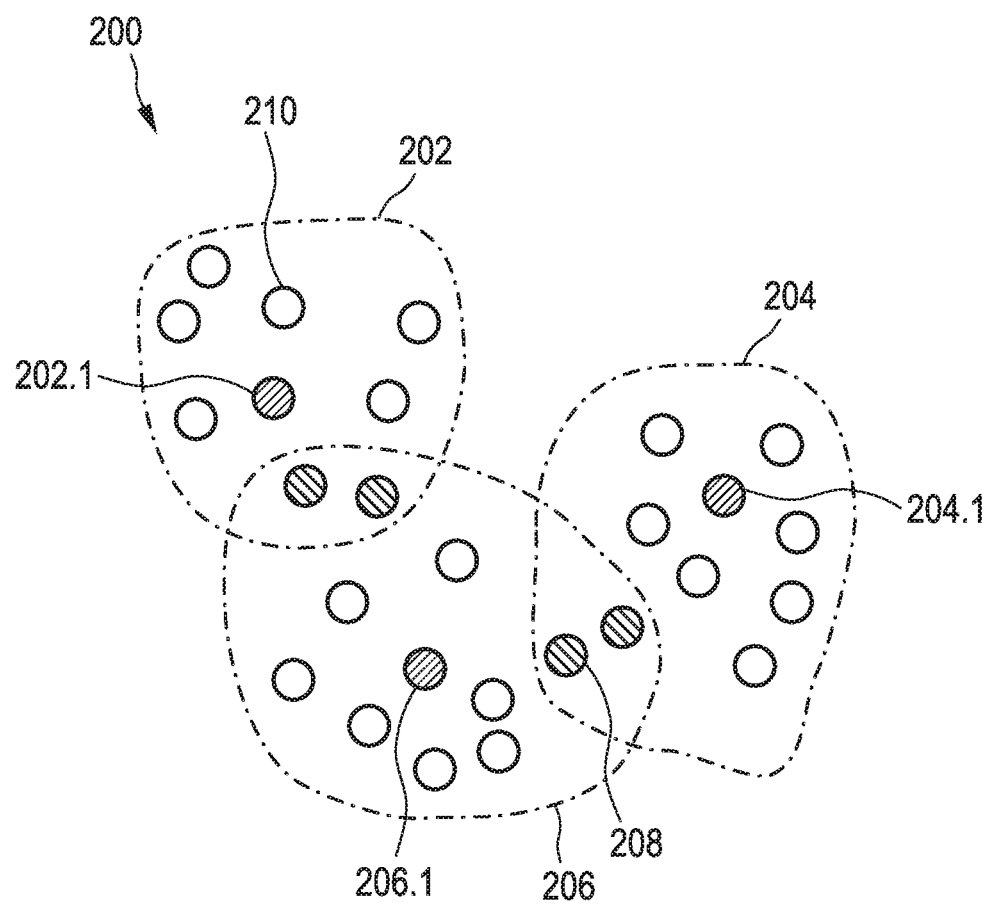
FIG. 2 is a schematic illustration of an embodiment of a mesh WLAN ESS comprising three WLAN BSSs.

FIG. 2 is a schematic illustration of an embodiment of a mesh WLAN ESS 200 comprising three mesh WLAN BSSs 202, 204, and 206. A spatial extension of each of the mesh WLAN BSSs is shown by respective dotted closed line shapes, and each of the mesh WLAN BSSs 202 to 206 has a plurality of WLAN devices which are indicated as circles. Each of these WLAN devices has a mesh WLAN controller 100 (not shown) according to the embodiment of FIG. 1. In every mesh WLAN BSS there is exactly WLAN device labeled 202.1, 204.1, and 206.1, respectively, which forms the mesh soft access point, i.e., having the mesh WLAN controller operating in the soft-access point mode. The mesh soft access points 202.1, 204.1 and 206.1 are indicated in FIG. 1 by a hatching pattern oriented from the lower left to the upper right. Those WLAN devices that create overlapping portions of the mesh WLAN BSSs are WLAN devices operating in the mesh bridge client mode, such as for instance the WLAN device 208. Such WLAN devices operating in the mesh bridge client mode are indicated by a bold hatching pattern oriented from the upper left to the lower right. Other WLAN devices which are associated with only one respective mesh WLAN BSS are operating in the mesh client mode and are indicated in FIG. 2 by circles without hatching. An exemplary WLAN device of this type is indicated by reference label 210.

All of the mesh WLAN BSSs 202 to 206 forming the ESS 200 have an identical service set identifier (SSID), but the BSSIDs are different, and the BSSIDs are all marked for identification as the mesh WLAN BSS type, as explained in the context of FIG. 1. Each of the mesh WLAN BSSs may use different WLAN channels. With a given number of WLAN devices in one mesh WLAN BSS, which number must be within a range given by a predetermined maximum number, and with different WLAN channels being used, the existing WLAN bandwidth is used efficiently. In comparison, if all devices were using the same channel or joining only one network, the available transmission capacity would be quickly jammed for normal communication.

A flooding algorithm is used to broadcast a message in the ESS 200, with a modification to the existing standard WLAN data packet format. All WLAN devices in a given mesh WLAN BSS will rebroadcast a received packet once, and any mesh bridge client device will rebroadcast the packet to all other associated mesh WLAN BSSs if such broadcast packet is received. If rebroadcasting is to be performed by a mesh bridge client to a different mesh WLAN BSS, the mesh bridge client will listen for a while to see if there is any further rebroadcasting from any other WLAN devices in the same BSS. If none, the mesh bridge client will try to rebroadcast a few times to be sure to combat interferences.

Specifically, any such WLAN message to be broadcast in the ESS 200 is marked with a special bit in the BSSID. The BSSID is a field in a standard infrastructure WLAN data packet. An example format of a standard WLAN frame to be sent to an access point is shown below in TABLE 2:

TABLE 2

| | Field Number | | | |
|---|---|---|---|---|
| | 1 | 2 | 3 | 4 |
| Field Name | Frame control | Duration ID | BSSID (Receiver Address) | Sender Address |
| | Field Number | | | |
| | 5 | 6 | 7 | 8 |
| Field Name | Destination Address | Sequence Control | Payload | Frame Checksum |

Thus, with reference to TABLE 1 and TABLE 2 above and to TABLE 3 below, the first least bit of the first octet of the BSSID in the third field of a frame is to indicate a data packet to a WLAN device is intended to be forwarded between BSSs. A broadcast packet is constructed by marking the mesh BSSID in a standard WLAN data packet by setting the first least bit of the first mesh BSSID byte to 1. TABLE 2 shows the payload fields of a data packed for broadcast transmission within an ESS.

TABLE 3

| Field Name | Description |
|---|---|
| Type | 1 = broadcast packet |
| Originating Address | Device initiating the broadcast |
| Radius | Maximum hops to travel in mesh network |
| Data | depending on message content |
| Sequence control | To recognize duplicate packet |

Thus, the fields of TABLE 3 are to be found in the field 7 "Payload" of the frame format shown in TABLE 2.

This special payload definition is thus used on the standard WLAN data packet, to facilitate the broadcast algorithm. This way, any device that has received this packet will be treated differently. In particular, a standard WLAN broadcast process is used to send the packet to the mesh WLAN BSS, but each received packet by a WLAN device in a given WLAN BSS will be rebroadcast by flooding:

i. This packet will be tracked. If it is a new packet, it will be rebroadcast if the radius is not zero after it has been subtracted by one, ii. the mesh BSSID field will be replaced by a given WLAN device be the one from currently joined mesh WLAN BSS. Thus, different BSSIDs could appear in this field. When the bridge node forwards the broadcasting packets, a new BSSID could appear in this field. Standard WLAN packet processing will ignore this field A flooding based route discovery algorithm is used to find any destination node in the lightweight network from any source node. A special payload is used for assisting a route discovery algorithm, as defined in TABLE 4 below. TABLE 4 shows payload fields of a route discovery packet.

TABLE 4

| Field Name | Description |
| --- | --- |
| Type | 2 = route discovery packet |
| Originating Address | Device initiating the route request |
| Radius | Maximum hops to travel in mesh network |
| Target Address | Target device address |
| Sequence control | To recognize duplicate packet |

Each WLAN device will remember the original sending device address, and the address which forwarded the packet, and a routing table entry is created, wherein the sending device forms the target, and the forwarding device forms the next hop. After the broadcast is finished, the destination device or each device will send the original sending device a reply, with the reply packet passing the delivering route, each device will record the replying device and the forward device in the routing table, such that the reverse route is created.

In this context, unicast message delivery can be achieved by creating a delivering route in the mesh WLAN ESS. To this end the above route discovery algorithm may be used, which in turn uses the above broadcast algorithm to send a route request command to each node in the mesh WLAN ESS. The route request packet is constructed as shown in TABLE 4, and the target device address field of the route request packet is used to specify which destination WLAN device the route request is used to discover. The route request packet is sent just like the broadcast packet, such that all the WLAN devices (also referred to as nodes herein) in the mesh WLAN ESS will receive the same payload content. Each node that has received the route request packet will record one entry in the routing table, with the originating WLAN device as the target, and the WLAN device which forwarded this packet as the next hop address, such that once the target device is requested to deliver a unicast message, the next hop address is used for forwarding. Thus, once the delivering route is created from one WLAN device to another WLAN device in the mesh WLAN ESS, a unicast message can be passed by all the forwarding nodes along the path.

A unicast message or command can ask for a reply from the destination WLAN device. In one embodiment, if a reply is not received with a predetermined time out period by the originating WLAN device, the unicast message or command is considered lost. In this event, the delivering path is presumed damaged, and the originating WLAN device issues a new route request to find and receive a reply from the destination WLAN device.

If multiple route request packets are received by a given WLAN device in the course of the process, that route request packets with the highest received signal strength will be updated into the routing table, such that a better delivering route can be created.

After the route request broadcast has been finished, the WLAN device address matches the destination WLAN device address in the target address field, and this WLAN device will deliver a unicast message to the originating WLAN device as a reply. Also during the delivering, the reverse route is recorded by all the nodes in the delivering path, that is, each node in the path will record one entry in the routing table, with the destination address as the target, and the device which forwarded this packet as the next hop.

Based on this process also a multicast transmission can be achieved by using as the destination WLAN device address in the target address field a multicast address. Then all the nodes in the mesh WLAN ESS that match the multicast address will send replies to the originating WLAN device, so that all the reverse delivering paths can be established. The multicast address can be used to specify special types of WLAN devices, for example, all mesh soft access point devices, all mesh WLAN client devices, or all mesh bridge client devices.

Once the lightweight mesh network can accept broadcast and unicast messages, any WLAN device in the mesh WLAN ESS can communicate with any other WLAN device in the mesh WLAN ESS. Using the broadcast algorithm and the route discovery algorithm described above, one can instruct any WLAN device in the mesh WLAN ESS to send a message to all the WLAN devices in the mesh WLAN ESS, or to send a message as an originating WLAN device to any other WLAN device in the mesh WLAN ESS, and the given destination WLAN device in the mesh WLAN ESS can reply by sending a message to the originating WLAN device.

Each mesh WLAN BSS, which may also be called a cell, forms a star network with one WLAN device operating in the soft-access-point mode and thus forming the mesh soft AP device, and a plurality of mesh client WLAN devices, which operate in the mesh client mode. The mesh bridge-client mode is used to ensure communication between different mesh WLAN BSSs that together constitute a mesh WLAN ESS. The WLAN BSSs cells can thus be considered interconnected to form a mesh WLAN ESS.

This way, a "giant" mesh WLAN ESS can be formed automatically by all the originally un-provisioned WLAN devices. It allows hundreds or even thousands of WLAN devices to participate in this mesh WLAN ESS. An example for such large numbers is formed by professional lighting Application, where WLAN commissioning of hundreds of luminaires at once, for instance on one building floor, is achieved. The mesh WLAN ESS does not reduce the available bandwidth significantly and maintains sufficient bandwidth for communication.

The mesh WLAN ESS is particularly suited for temporary use, for instance for passing infrastructure WLAN network configuration parameters to the network. Thus, performance or reliability is not of primary concern. Instead, ease of implementation on existing WLAN platform is achieved, and a reuse of existing WLAN functionality. For instance, the protocol used for communication in the mesh WLAN ESS can be implemented by modifying the existing WLAN standard protocol slightly, or piggybacking, such that the changes do not significantly alter the stability of the existing WLAN controller functions, and also do increase the complexity of modifying an existing WLAN controller. Therefore, a standard WLAN network will not process the features the mesh WLAN packets, but the other WLAN functions are not influenced by such mesh WLAN packets. On the other hand, the mesh WLAN ESS can process both the features of mesh WLANN network packets and the general WLAN functions.

Figure 3:
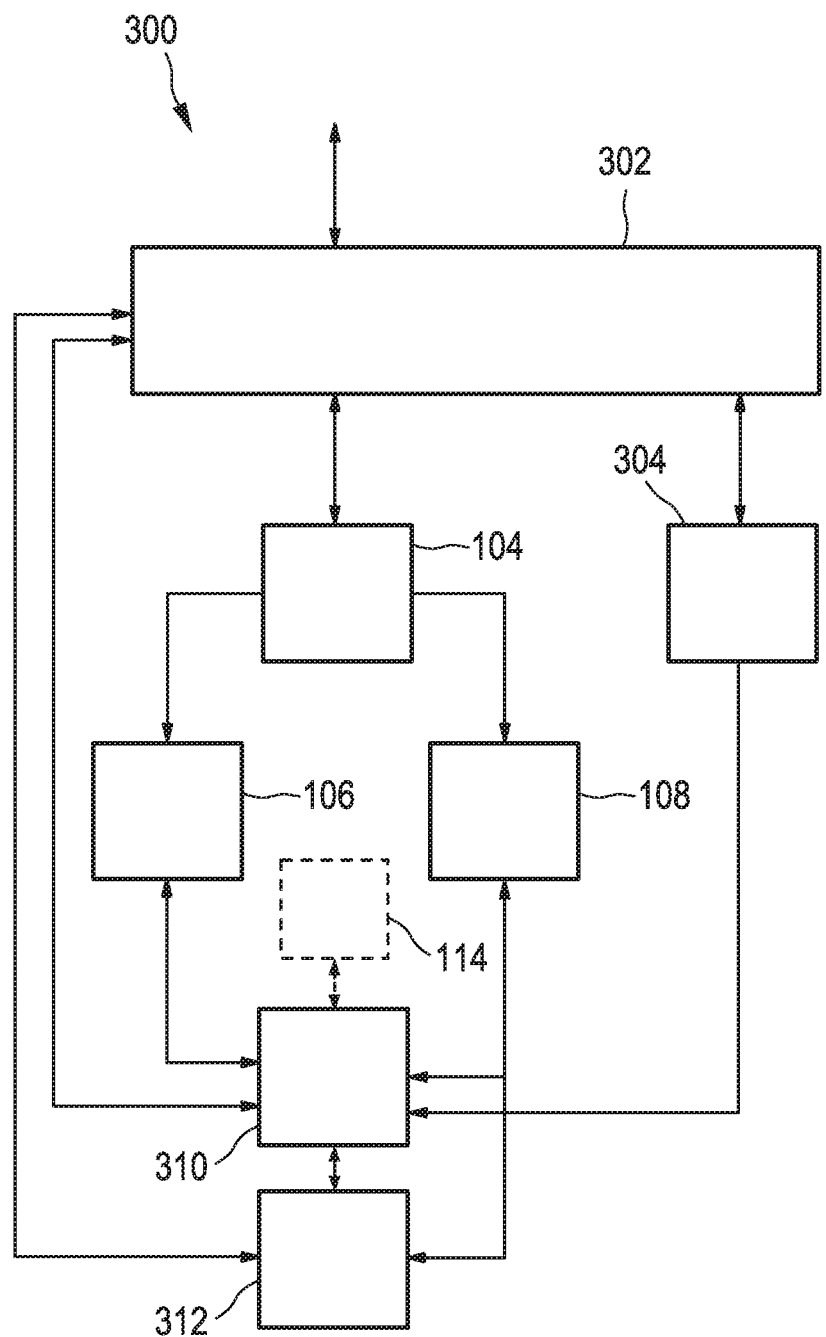
FIG. 3 shows a block diagram of a further embodiment of a mesh WLAN controller.

FIG. 3 shows a block diagram of a further embodiment of a mesh WLAN controller. The mesh WLAN controller 300 resembles the mesh WLAN controller 100 of FIG. 1 in many features. In that far, the same reference labels are used in FIG. 3 as in FIG. 1, and reference is made to the description of FIG. 1 given above.

In addition to functions of the WLAN control interface 102 described in the context of FIG. 1, the WLAN control interface 302 for receiving and providing baseband control and payload information of the mesh WLAN controller 300 forms a wired control interface for exchanging control communication between the mesh WLAN control functions, in particular the operation control 104 and an integrated infrastructure WLAN controller unit 304. In particular, the operation control unit 104 of the mesh WLAN controller 300 is additionally configured to detect in a received mesh WLAN message infrastructure WLAN credential information pertaining to an infrastructure WLAN BSS, and to provide the received infrastructure WLAN credential information as an output to the infrastructure WLAN controller unit 304 via the WLAN control interface 302. Advantageously the mesh WLAN functions are subsequently switched to an inactive mode.

The mesh network management unit 310 is in addition to the functionality of the mesh network management unit 110 described in the context of FIG. 1 configured, when operating under control by the infrastructure WLAN controller unit 304, to perform standard infrastructure WLAN networking functions on layers 2 and 3 of the OSI standard model.

The integrated infrastructure WLAN controller unit 304 is in one variant configured to remain in an inactive mode upon initial power-on. Furthermore, upon receiving the infrastructure WLAN credential information from the mesh WLAN controller via the control interface, infrastructure WLAN controller unit 304 is configured the operate in an infrastructure station mode controlling infrastructure WLAN communication of a WLAN device with an infrastructure WLAN BSS for achieving allowance as an infrastructure WLAN station to the infrastructure WLAN BSS.

The WLAN controller 300 can be implemented advantageously as a single integrated electronic component. In particular, the mesh WLAN controller functionality can be implemented as an add-on to an existing standard WLAN controller architecture, for instance as an additional software code layer on an existing software code implementing the standard WLAN controller architecture.

Figure 4:
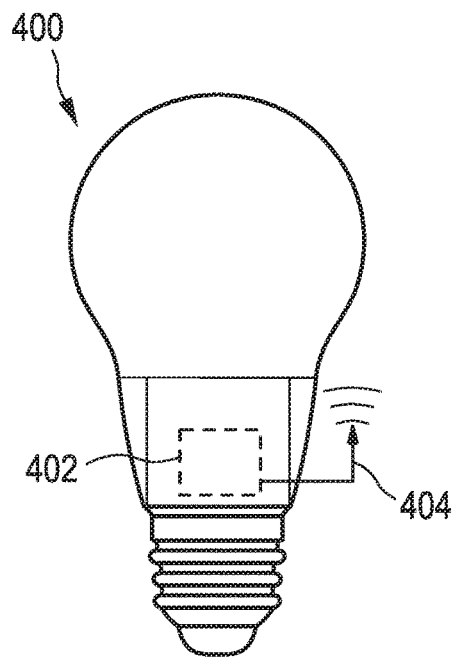
FIG. 4 shows a WLAN lightbulb as an embodiment of a headless WLAN device.

FIG. 4 shows a WLAN lighting device 400 as an embodiment of a headless WLAN device. The WLAN lighting device 400 forms a non-limiting example that illustrates only one of many possible WLAN application devices that can be formed by incorporating an integrated WLAN component 402 with a mesh WLAN controller such as the mesh WLAN controller 300 of FIG. 3, or the mesh WLAN controller 100 of FIG. 1 and additional RF components required for WLAN operation, including an antenna 404.

Figure 5:
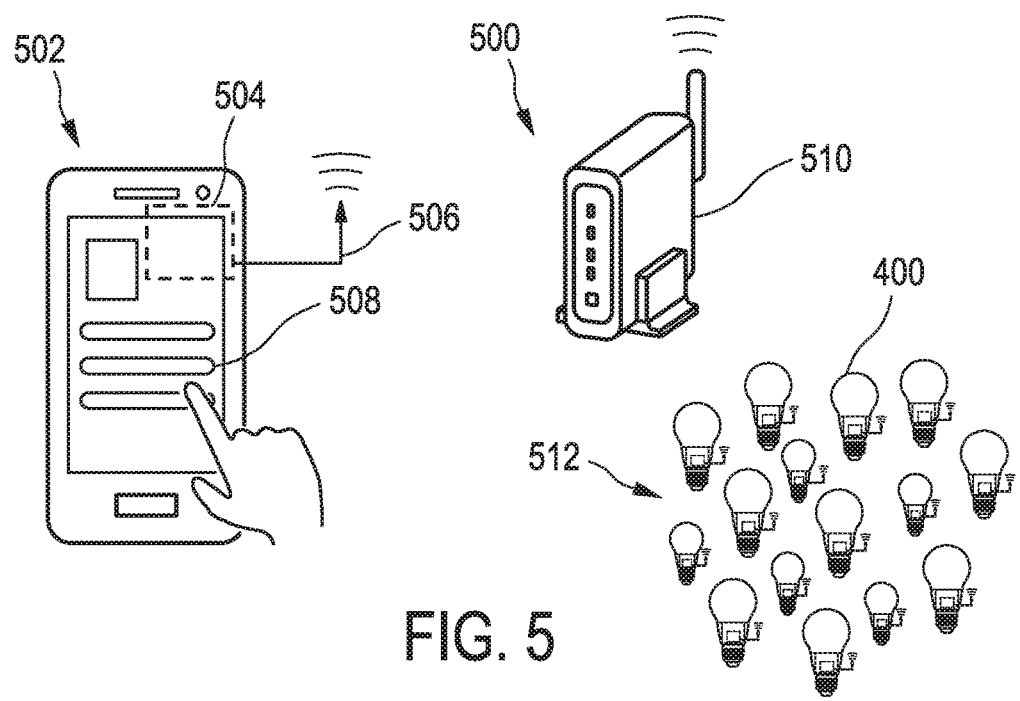
FIG. 5 shows an embodiment of a WLAN arrangement, which comprises an infrastructure WLAN configurator device, an infrastructure WLAN access point, and a mesh WLAN ESS.

FIG. 5 shows an embodiment of a WLAN arrangement 500, which comprises an infrastructure WLAN configurator device 502, an infrastructure WLAN access point 510, and a mesh WLAN ESS 512 formed by a plurality of WLAN lighting devices 400.

The infrastructure WLAN configurator device 502 comprises an integrated WLAN component 504 with a mesh WLAN controller (not shown) such as the mesh WLAN controller 300 of FIG. 3, and a graphical user interface 508 forming an example of a configuration interface that receives infrastructure WLAN credential information of an infrastructure WLAN BSS comprising the infrastructure WLAN access point 510, in the present case by manual user input. Instead of a manual user input, another configuration interface such as a wireless communication interface can be used for receiving the infrastructure WLAN credential information. The configuration interface provides the received infrastructure WLAN credential information to the mesh WLAN controller. The mesh WLAN controller receives the infrastructure WLAN credential information from the configuration interface and forwards the received infrastructure WLAN credential information in the form of at least one mesh WLAN message within at least one of the mesh WLAN BSSs to which mesh client access has been achieved by the WLAN configurator device 500. Further distribution of the received infrastructure WLAN credential information can be achieved by broadcast or unicast WLAN messages described herein and sent from the WLAN configurator device 500 to the WLAN devices within the mesh WLAN ESS.

Figure 6:
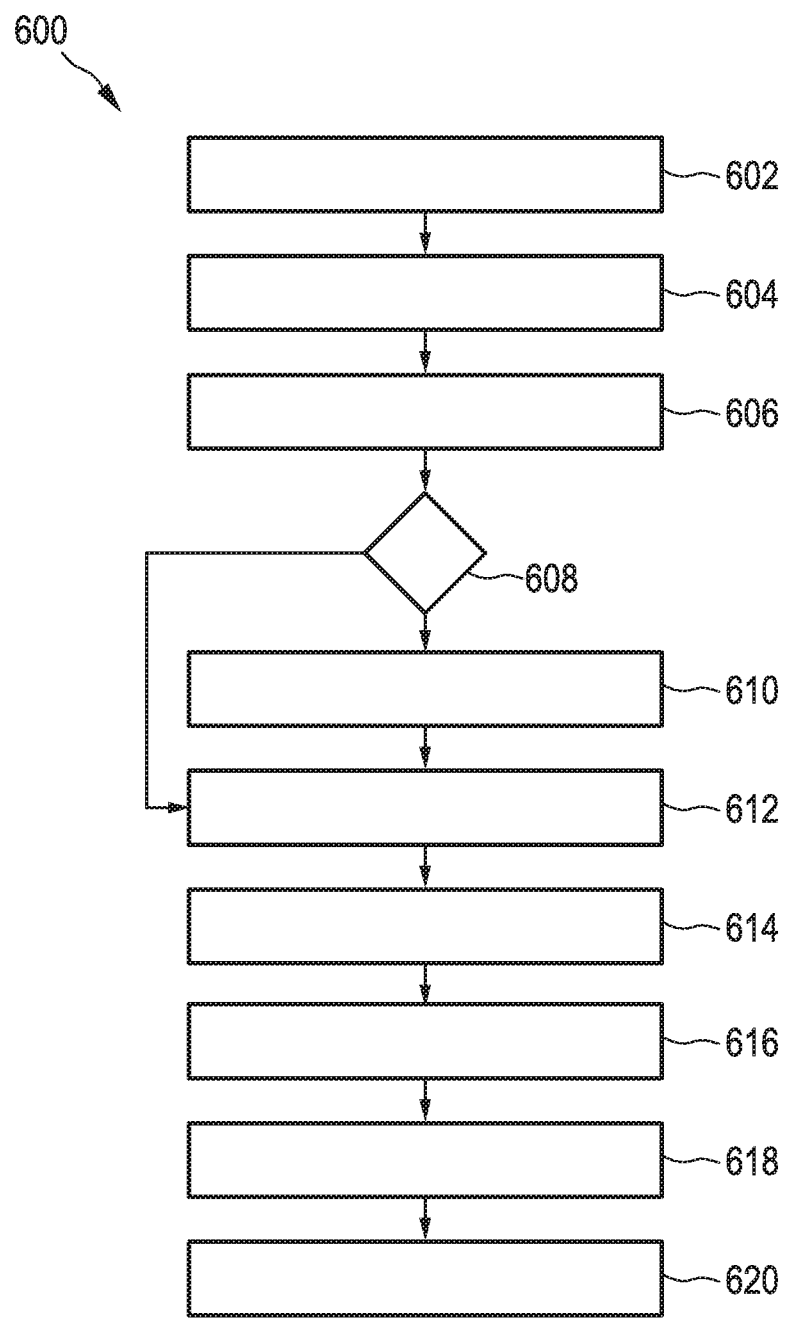
FIG. 6 is a flow diagram of a method for operating a mesh WLAN controller.

Next, reference is made to FIG. 6. FIG. 6 is a flow diagram of a method 600 for operating a mesh WLAN controller. The method comprises operating (step 602) the mesh WLAN controller either in a mesh soft-access-point mode or in a mesh client mode. When operating in the mesh client mode, the method continues with performing (step 604) a mesh network scan upon initial power-on, for detecting at least one mesh WLAN BSS. At step 606, the method continues with sending a mesh client access request to at least one of the mesh WLAN BSSs detected, and, if it is determined that mesh client access has been achieved (step 608), providing (step 610) mesh client access information indicative to the accessed WLAN BSSs of any other mesh WLAN BSS to which mesh client access has been achieved.

If mesh client access is not achieved in exchange with any of the detected mesh WLAN BSSs, the method branches from step 608 to switching (step 612) to operating in the mesh soft-access-point mode, and upon receiving (step 614) an instruction to operate in a mesh bridge-client mode, switching to the mesh bridge-client mode (step 616) and detecting (step 618) mesh WLAN messages from any of the mesh WLAN BSSs to which mesh client access has been achieved. Furthermore, the method comprises forwarding (step 620) the received mesh WLAN messages within any other of the mesh WLAN BSSs to which mesh client access has been achieved.

As an option, a self-healing method can be performed in addition by a mesh WLAN controller when detecting that connection to the mesh WLAN BSS is lost while operating in the mesh client mode. Such loss of connection may occur if the WLAN device operating in the mesh soft access point for forming the mesh WLAN BSS is switched off, for instance due to device failure or energy loss. This incident is detectable by loss of a beacon from the mesh soft access point. In this event, the mesh WLAN controller the client devices will perform start from step 604, to either join another mesh WLAN BSS or to create new WLAN BSS.

In case a mesh bridge device is switched off, according to the self-healing method, the WLAN device operating in the soft access point mode will detect a too long time to response, and presume that the mesh bridge client device is lost.

The WLAN device acting as the mesh soft access point then picks a new mesh bridge client within the given WLAN BSS.

Such a change in a mesh soft access point or mesh bridge client device is notified by a broadcast message to the mesh WLAN ESS. If any WLAN device in the mesh WLAN ESS has a routing table entry with a matching address relating to the change, the routing table entry will be removed from the routing table.

Figure 7:
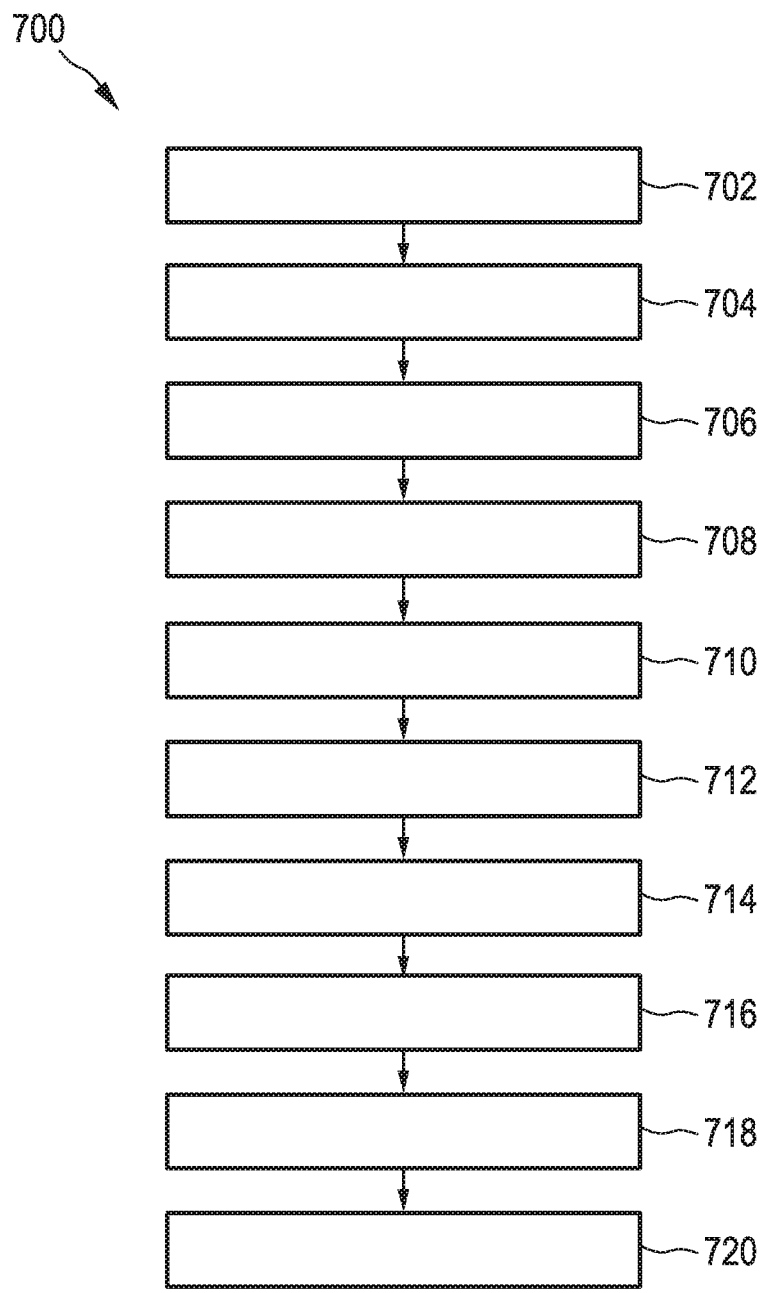
FIG. 7 is a flow diagram of an embodiment of a method for operating a WLAN arrangement, in particular in the context of WLAN provisioning.

FIG. 7 is a flow diagram of an embodiment of a method 700 for operating a WLAN arrangement such as the WLAN arrangement of FIG. 5, in particular in the context of WLAN provisioning. Reference is thus made to FIGS. 5 and 7 in parallel.

In operation of the WLAN arrangement for WLAN provisioning to the WLAN lighting devices 400, electrical power is provided to the WLAN lighting devices (step 702) by a power supply (not shown) for initial power on. The WLAN lighting devices are subsequently operative to form (step 704) a mesh WLAN ESS as described hereinabove. The WLAN configurator device 502 receives (step 706) infrastructure WLAN credential information by user input and performs (step 708) a mesh network scan for detecting (step 710) at least one mesh WLAN BSS within the mesh WLAN ESS 512. The WLAN configurator device then sends (step 712) a mesh client access request to at least one of the mesh WLAN BSSs detected, and, when mesh client access has been achieved (step 714), provides (step 716) the received infrastructure WLAN credential information to a mesh WLAN device of at least one of the mesh WLAN BSSs, to which mesh client access has been achieved, in the form of at least one mesh WLAN message.

More specifically, step 716 comprises, for providing infrastructure WLAN credential information to all WLAN devices in the mesh WLAN ESS 512, the WLAN configurator device sending a route request command to the mesh WLAN ESS 512, with the destination address filled as a broadcast address for the all nodes of the mesh WLAN ESS 512. As described before in the context of FIG. 2, all the nodes of the WLAN ESS 512 will then be found and routing paths will established for two way communication between the WLAN configurator device and all WLAN devices of the WLAN ESS 512. The WLAN configurator device will then know the list of all nodes in the WLAN ESS 512 from the route replies and communicate directly with each node in the network for passing the infrastructure WLAN credentials for the infrastructure WLAN provisioning. For each of the found WLAN devices of the mesh WLAN ESS 512, the configurator device can thus automatically pass the infrastructure WLAN credentials without any intervention of a user.

The WLAN lighting devices 400 of the mesh WLAN ESS 512 will subsequently switch (step 718) to operating in the infrastructure WLAN mode and acquiring access (step 720) to the infrastructure WLAN BSS of infrastructure WLAN access point 510. After all mesh WLAN devices have been provisioned, the mesh WLAN ESS 512 is closed, and all mesh WLAN devices will join the targeted infrastructure or ad-hoc WLAN network and function normally according to standard infrastructure or ad-hoc WLAN requirements.

In the infrastructure WLAN mode, the single WLAN access point 510 together with all associated stations (STAs) formed by the lighting devices 400 forms an infrastructure WLAN BSS. The WLAN access point 510 thus forms a master controlling the WLAN devices 400 within that BSS. The BSS forms a basic building-block of an 802.11 WLAN. The access point forms a master controlling the WLAN devices within that BSS.

In summary, a WLAN provisioning method is enabled by forming a mesh based WLAN provisioning method. The mesh WLAN ESS acts like a standard WLAN ESS network, with multiple WLAN BSSs interconnected, and may occupy multiple channels, but all are using the same SSID. For a standard WLAN client device therefore, this lightweight mesh network looks like a standard WLAN network. All the meshing functions are handled transparently by the lightweight mesh network. The WLAN configurator device will connect to the newly created lightweight mesh WLAN ESS and be able to communicate with all the WLAN devices in the mesh WLAN ESS. It can filter out unknown WLAN devices. A soft-AP provisioning procedure can be applied to each of the WLAN devices in the mesh WLAN ESS. The process can be automatic for every single WLAN device, or can be performed as a batch WLAN provisioning method. For communication within the mesh WLAN ESS, a flooding based algorithm is used to broadcast a message in the ESS, with a modification to the existing WLAN data packet format. In particular, the message is marked with a special bit in the BSSID, wherein the first least bit of the first byte of the BSSID is to indicate a data packet is intended to be forwarded between the mesh WLAN BSSs. A special payload is used on the standard WLAN data packet, to facilitate the broadcast algorithm. All devices in one mesh WLAN BSS will rebroadcast the received packet once, and bridge devices will rebroadcast the packet to all other mesh WLAN BSSs if one such broadcast packet is received.

A flooding based route discovery algorithm is used to find any destination node in the lightweight network from any source node. The above broadcast packet format is used to broadcast a data packet to all WLAN devices the mesh WLAN ESS, and a special payload is used for assisting the route discovery algorithm. Each WLAN device will remember the original sending (i.e., originating) WLAN device address, and the address of that WLAN device which forwarded the packet. A routing table entry is created, wherein the sending WLAN device is the target, and the forwarding WLAN device is the next hop. After the broadcast is finished, the destination WLAN device or each WLAN device will send the originating WLAN device a reply, with the reply packet passing the delivering route, each WLAN device will record the replying WLAN device and the forward WLAN device in the routing table, such that the reverse route is created.

With the broadcast algorithm and the route discovery algorithm, one can instruct any node in the network to send a message as an originating node to all the nodes in the mesh WLAN ESS as destination nodes (broadcast), or send a message to a specific node in the mesh WLAN ESS as the destination node (unicast), or send a message to a selected number of nodes in the mesh WLAN ESS as the destination nodes (multicast), and any of the destination nodes in the network can reply a message to the originating node.

An infrastructure WLAN configurator device as described above can then connect to one of the WLAN BSSs in the mesh WLAN ESS and then via that WLAN BSS, the infrastructure WLAN configurator device can communicate with any of the devices in the network, in both directions. The mesh WLAN networking concept involves in some embodiments disclosed herein modifications to the standard WLAN network stack or application, in particular a time offset to activate the a soft-access-point mode, a mesh WLAN network scan followed by joining the special mesh WLAN BSS, constructing and forwarding broadcast packets, constructing, forwarding, and recording a route discovery, and sending unicast packets.

Thus, a mesh WLAN controller operates in a mesh soft-access-point mode and in a mesh client mode. When operating in the mesh client mode it performs a mesh network scan, for detecting at least one mesh WLAN BSS, send mesh client access requests to mesh WLAN BSSs detected, and, if mesh client access is achieved, provide information indicative to the accessed WLAN BSSs of any other mesh WLAN BSS to which mesh client access is achieved, and if mesh client access is not achieved with any of the detected mesh WLAN BSSs, switch to operating in the mesh soft-access-point mode. Upon receiving an instruction to operate in a mesh bridge-client mode, the controller detects messages from any of the mesh WLAN BSSs with mesh client access, and forwards the received mesh WLAN messages within at least one, in one embodiment within any other of the mesh WLAN BSSs to which mesh client access has been achieved.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In particular the invention is not restricted to applications in lighting.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A mesh wireless local area network controller, herein mesh WLAN controller, which is configured to operate in a mesh soft-access-point mode and in a mesh client mode, and, when operating in the mesh client mode,
to perform a mesh network scan upon initial power-on, for detecting at least one mesh WLAN BSS,
to send a mesh client access request to at least one of the mesh WLAN BSSs detected, and, if mesh client access has been achieved, provide mesh client access information to the accessed WLAN BSSs indicative of any other mesh WLAN BSS, to which mesh client access has been achieved, and
if mesh client access is not achieved in exchange with any of the detected mesh WLAN BSSs, switch to operating in the mesh soft-access-point mode.

2. The mesh WLAN controller of claim 1, which is further configured
when operating in the mesh client mode, and upon having achieved mesh client access to more than one mesh WLAN BSS and receiving an instruction to operate in a mesh bridge-client mode,
to detect and to receive mesh WLAN messages from any of the mesh WLAN BSSs to which mesh client access has been achieved, and
to forward the received mesh WLAN messages within any other of the mesh WLAN BSSs to which mesh client access has been achieved.

3. The mesh WLAN controller of claim 1, which is configured, when operating in the mesh client mode, to wait for a random time span upon initial power-on before performing the mesh WLAN scan.

4. The mesh WLAN controller of claim 1, which is configured, when operating in the mesh soft-access-point mode,
to provide a unique mesh basic service set, herein BSS identifier, which allows an identification as a mesh soft access point of a mesh WLAN BSS,
and upon receiving a mesh client access request from an external mesh WLAN device, to allow the external mesh WLAN device access to the mesh WLAN BSS, unless a predetermined maximum number of external mesh WLAN devices already have access to the mesh WLAN BSS;
and upon determining that an external mesh WLAN device has mesh client access to not only the subject mesh WLAN BSS, but additionally to a number of external other mesh WLAN BSSs, instruct the external mesh WLAN device to operate in the mesh bridge-client mode.

5. The mesh WLAN controller of claim 4, which is configured, when operating in the mesh soft-access-point mode, to determine and provide the mesh BSS identifier as a code including a unique network identifier and a mesh type identifier, the mesh type identifier indicating that the BSS is a mesh WLAN BSS that is distinguished from an infrastructure WLAN BSS and from an ad-hoc WLAN Independent BSS.

6. The mesh WLAN controller of claim 1,
which comprises a wired control interface for exchanging control communication with an infrastructure WLAN controller unit, and
which is configured to detect in a received mesh WLAN message infrastructure WLAN credential information pertaining to an infrastructure WLAN BSS, and to provide the received infrastructure WLAN credential information as an output via the control interface, and to subsequently switch to an inactive mode.

7. The mesh WLAN controller of claim 6, further comprising
an integrated infrastructure WLAN controller unit, which is configured
to remain in an inactive mode upon initial power-on,
upon receiving the infrastructure WLAN credential information from the mesh WLAN controller via the control interface, operate in an infrastructure station mode controlling infrastructure WLAN communication with the infrastructure WLAN BSS for requesting allowance as an infrastructure WLAN station to the infrastructure WLAN BSS.

8. A WLAN device, comprising a mesh WLAN controller according to claim 7.

9. An infrastructure WLAN configurator device, comprising
a mesh WLAN controller according to claim 7, a configuration interface configured to receive infrastructure WLAN credential information from an external entity and to provide the received infrastructure WLAN credential information to the mesh WLAN controller; wherein the mesh WLAN controller is additionally configured to receive the infrastructure WLAN credential information from the configuration interface and to forward the received infrastructure WLAN credential information in the form of at least one mesh WLAN message within at least one of the mesh WLAN BSSs to which mesh client access has been achieved.

10. The infrastructure WLAN configurator device of claim 9, which is additionally configured to deactivate the mesh WLAN controller upon successfully forwarding the infrastructure WLAN credential information.

11. A method for operating a mesh wireless local area network controller, herein mesh WLAN controller, comprising operating the mesh WLAN controller either in a mesh soft-access-point mode or in a mesh client mode, and, when operating in the mesh client mode, performing a mesh network scan upon initial power-on, for detecting at least one mesh WLAN BSS, sending a mesh client access request to at least one of the mesh WLAN BSSs detected, and, if mesh client access has been achieved, providing to the accessed WLAN BSSs mesh client access information indicative of any other mesh WLAN BSS to which mesh client access has been achieved, and if mesh client access has not been achieved in exchange with any of the detected mesh WLAN BSSs, switching to operating in the mesh soft-access-point mode.

12. The method of claim 11, further comprising, when operating in the mesh client mode, and if mesh client access has been achieved to more than one of the mesh WLAN BSSs detected and upon receiving an instruction to operate in a mesh bridge-client mode, detecting mesh WLAN messages from any of the mesh WLAN BSSs to which mesh client access has been achieved and forwarding the received mesh WLAN messages within at least one other of the mesh WLAN BSSs to which mesh client access has been achieved.

13. A method for operating an infrastructure WLAN configurator device, the method comprising, receiving infrastructure WLAN credential information from an external entity;

performing a mesh network scan for detecting at least one mesh WLAN BSS of a mesh WLAN ESS;

sending a mesh client access request to at least one of the mesh WLAN BSSs detected; and, if mesh client access has been achieved, providing the received infrastructure WLAN credential information to a mesh WLAN device of at least one of the mesh WLAN BSSs, to which mesh client access has been achieved, in the form of at least one mesh WLAN message.

14. The method of claim 13, wherein providing the received infrastructure WLAN credential information comprises the WLAN configurator device sending a route request command to the mesh WLAN ESS, with a destination address being a broadcast address for all mesh WLAN devices of the mesh WLAN ESS;

receiving route reply messages and maintaining a list of all responding mesh WLAN devices in the WLAN ESS; and communicating directly using unicast communication with each node in the WLAN ESS for providing the infrastructure WLAN credential information.

15. A non-transitory computer readable storage medium including a computer program including a set of instructions executable by a processor for operating a mesh wireless local area network controller, the readable storage medium comprising code for:

receiving infrastructure WLAN credential information from an external entity;

performing a mesh network scan for detecting at least one mesh WLAN BSS of a mesh WLAN ESS;

sending a mesh client access request to at least one of the mesh WLAN BSSs detected; and, if mesh client access has been achieved, providing the received infrastructure WLAN credential information to a mesh WLAN device of at least one of the mesh WLAN BSSs, to which mesh client access has been achieved, in the form of at least one mesh WLAN message.

* * * * *